(12) United States Patent
Chang et al.

(10) Patent No.: US 7,738,348 B2
(45) Date of Patent: Jun. 15, 2010

(54) FLEXIBLE POWER INTERFACE CONTROL SYSTEM AND METHOD OF OPTICAL DISK DRIVE

(75) Inventors: Kuang-jung Chang, Taipei (TW); Chi-pei Huang, Miaoli (TW); Chih-chung Wu, Pingtung (TW)

(73) Assignee: MEDIATEK Inc., Hsin-Chu (TW)

( * ) Notice: Subject to any disclaimer, the term of this patent is extended or adjusted under 35 U.S.C. 154(b) by 636 days.

(21) Appl. No.: 11/741,402

(22) Filed: Apr. 27, 2007

(65) Prior Publication Data

US 2007/0286041 A1 Dec. 13, 2007

Related U.S. Application Data

(60) Provisional application No. 60/798,633, filed on May 8, 2006.

(51) Int. Cl.
*G11B 7/00* (2006.01)
(52) U.S. Cl. .................. 369/116; 369/53.26; 369/47.52
(58) Field of Classification Search .................. 369/116, 369/53.26, 47.5–47.53, 59.11, 121
See application file for complete search history.

(56) References Cited

U.S. PATENT DOCUMENTS

| 6,535,470 | B1 | 3/2003 | Wu |
| 6,661,817 | B1 * | 12/2003 | Ames et al. ............. 372/29.021 |
| 6,940,790 | B1 | 9/2005 | Powelson et al. |
| 7,006,420 | B1 | 2/2006 | Hsu et al. |
| 7,068,579 | B2 | 6/2006 | Tasaka et al. |
| 2004/0264315 | A1 * | 12/2004 | Kaku ......................... 369/116 |

* cited by examiner

*Primary Examiner*—Thang V Tran (57) ABSTRACT

The present invention provides a flexible power interface control system and a method of the same capable of flexibly changing the LDD setting for complying with different controlling states or different write strategies. The different controlling states or write strategies may be used for different disk types or different writing modes. The flexible LDD setting in accordance with the present invention is contributing to improve the recording performance and stability of an optical disk drive for complying with various disk types or different writing modes.

17 Claims, 10 Drawing Sheets

FLEXIBLE POWER INTERFACE CONTROL SYSTEM AND METHOD OF OPTICAL DISK DRIVE

RELATED APPLICATION

Under 35 USC 119, this application claims the benefit of a priority provisional application filed May 8, 2006, Ser. No. 60/798,633.

FIELD OF THE INVENTION

The present invention generally relates to a flexible power interface control system and a method for flexibly control at least one of the power interfaces applied in the laser diode drive (LDD).

BACKGROUND OF THE INVENTION

In various optical disk drives, such as CD-RW, DVD+R\RW, DVD−R\RW or DVD-RAM etc., a laser diode drive (LDD) provides a driving current to a laser diode (LD) for generating a laser power, thereby the laser diode can read or write the disk in the optical disk drive.

There are two types of power interfaces applied in the LDD for controlling the reading or writing powers of the laser diode, one type is a transistor-transistor logic (TTL) interface, another is a low voltage differential signaling (LVDS) interface. The TTL interface is often used in the situations requiring just a lower response rate, such as a stable reading power control in CD-RW or DVD-RW devices. The LVDS interface is often used in the situations requiring a higher response rate, such as a writing power control in DVD+R 16× speed, DVD-RAM 5× speed or DVD-RAM 16× speed devices etc.

Figure 1:
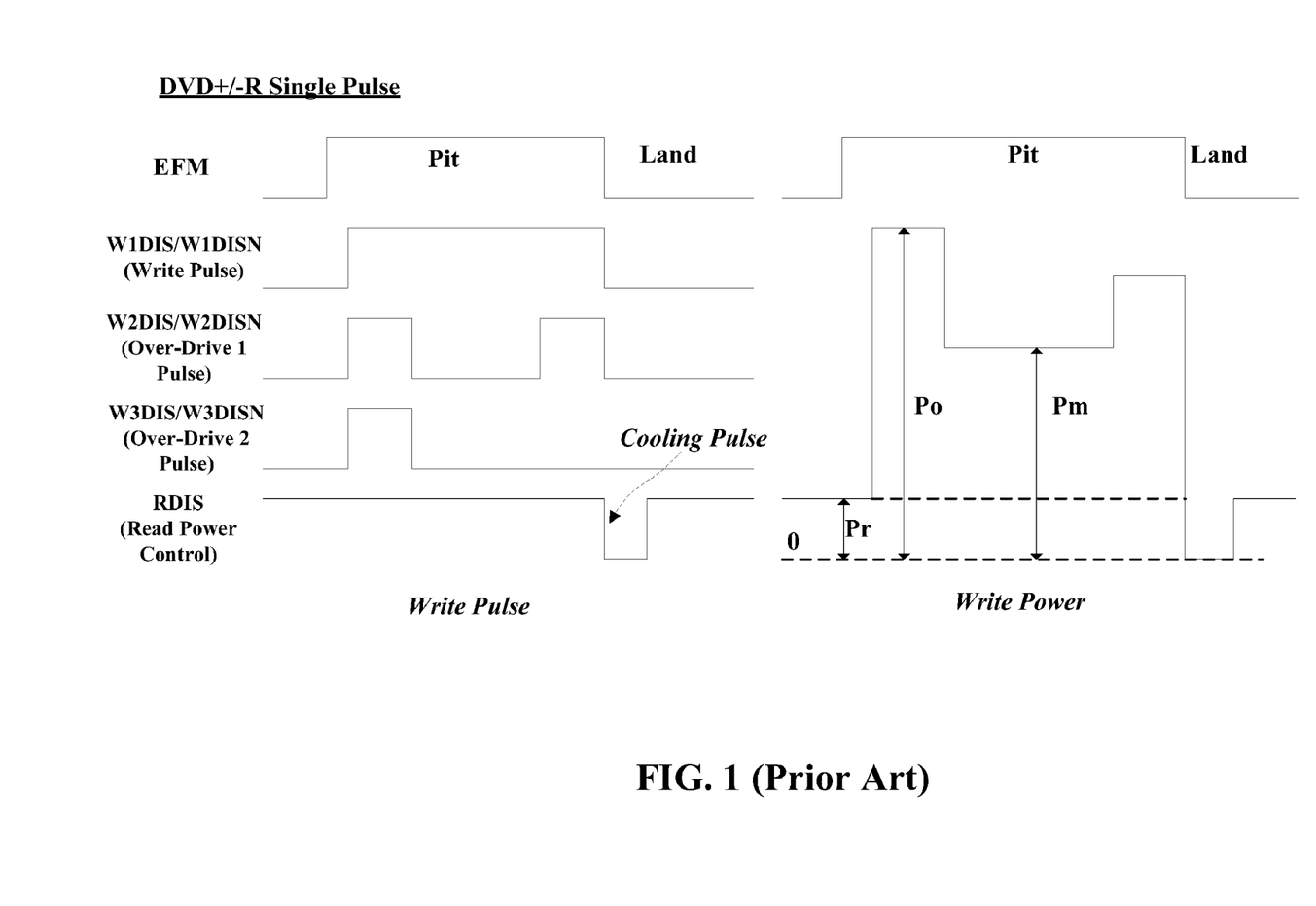
FIG. 1 shows a conventional power interface control of DVD+/−R in single-pulse mode.

FIG. 1 shows a conventional power control of DVD+/−R/RW in a single-pulse mode. When writing data in the DVD+/−R/RW disk, the signal pulse power control signal as shown in FIG. 1 is commonly adopted. In the single-pulse mode of DVD+/−R/RW, a cooling pulse is always generated for forming a perfect pit. However, the common LDD uses the TTL interface to implement reading power control no matter in reading or writing data. As shown in the FIG. 1, the TTL will be also set to generate a cooling pulse. Due to the slow response rate, the cooling pulse is not as sharp as required. Therefore, the cooling pulse can not be precisely controlled. Alternatively, if the LDD use the LVDS to implement the read power control for reading or writing data, the radio frequency (RF) signal read from the disk may be easily induced noises due to the higher response rate of the LVDS interface The noises accompanied with the RF signal will increase a variation of signal to noise ratio (S/N ratio) during data transmission in the optical disk drive. The S/N ratio variation will degrade the recording performance of the optical disk drive.

Furthermore, the present DVD drive is required to support at least three DVD formats, i.e. DVD+R/RW, DVD−R/RW and DVD-RAM. The different write strategies are applied for writing different disk types or writing the same disk under different writing speeds in order to obtain an optimal writing performance. The conventional power control systems or methods cannot provide a flexible LDD setting for complying with different write strategies. Therefore, a novel flexible power control system and method are provided to resolve the above problems.

SUMMARY OF THE INVENTION

An object of the present invention is to provide a flexible power interface control system and a method of same for controlling an optical disk drive, which are capable of flexibly changing the LDD setting complied with different controlling states or different write strategies.

The flexible power interface control system of the present invention having a laser diode (LD) for generating a laser power and a laser diode drive (LDD) for driving the laser diode, said LDD comprising at least a first power interface and a plurality of second power interfaces, the first power interface having lower response rate than the second power interface, comprises a servo control module for identifying a controlling state of the optical disk drive, a write strategy control module for generating a write strategy according to the controlling state, and an interface setting module for setting the first and second power interfaces according to the write strategy or the controlling state.

The flexible power interface control method of the present invention comprises following steps of:

Step 1: The servo control module determines a controlling state of the optical disk drive for reading or writing an inserted disk. The controlling state includes the disk type of an inserted disk, the rotation speed or data transferring rate.

Step 2: The write strategy control module generates an optimum write strategy for writing the inserted disk according to the controlling state. The write strategy can be a single pulse write strategy or a multi-pulse write strategy for writing the inserted disk.

Step 3: The interface setting module sets a plurality of power interfaces according to the write strategy or the controlling state. The power interfaces comprises a TTL power interface and a plurality of LVDS power interface, controlled by the interface setting module. The controlling state or the write strategy represents a writing mode or a reading mode of the optical disk drive.

The flexible power interface control system and the method of the same according to the present invention can flexibly change the LDD setting for complying with different controlling state of the optical disk drive. The different controlling states maybe the different writing speed, different type of inserted optical disk or different writing strategy. The flexible LDD setting in accordance with the present invention is contributing to improve the recording performance and stability of an optical disk drive for complying with various disk types or different writing modes.

DETAILED DESCRIPTION OF THE PREFERRED EMBODIMENTS

The present invention is directed to a power interface control system and a method capable of flexibly changing the LDD setting complied with different controlling states or different write strategies of the optical disk drive.

Figure 2:
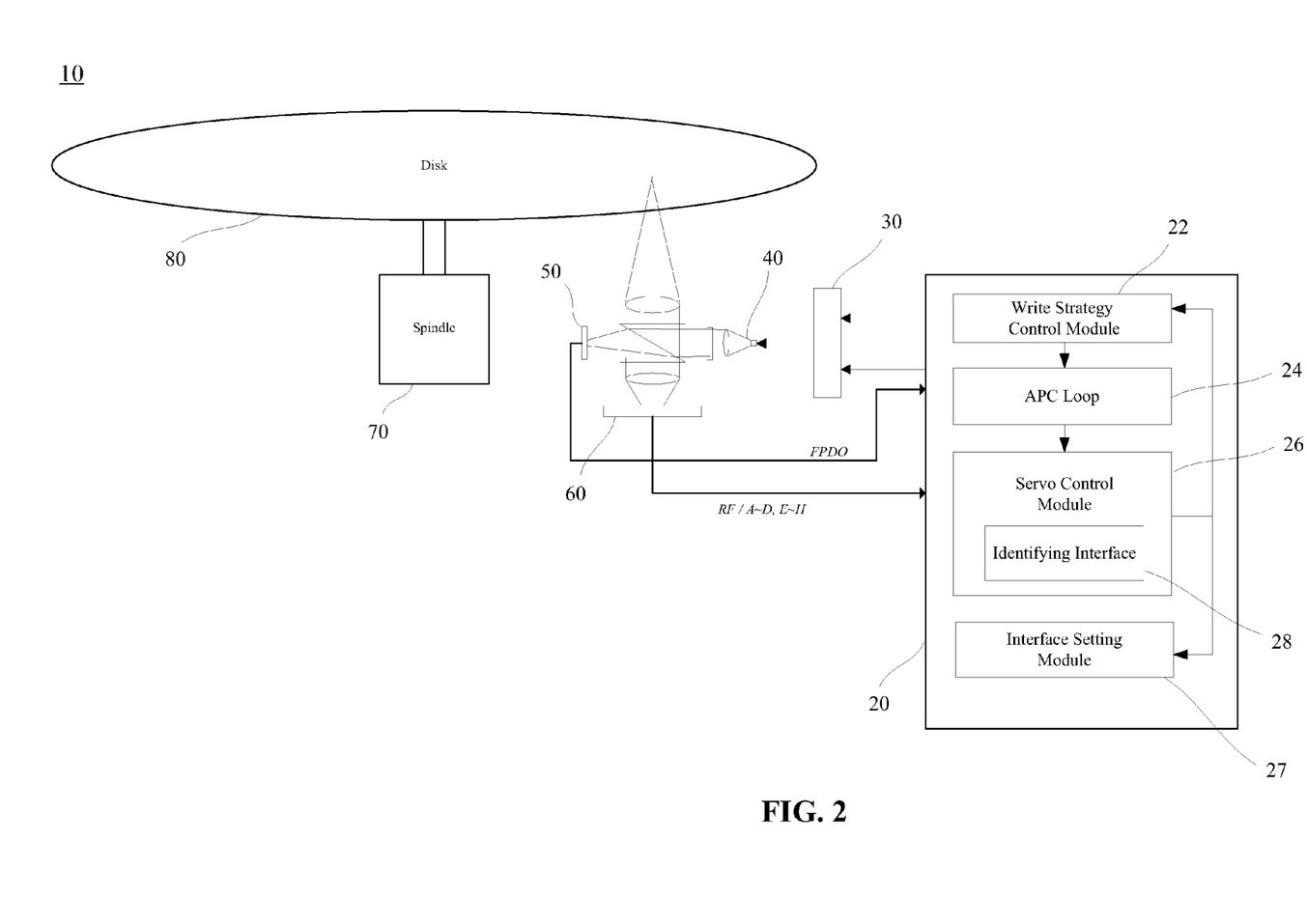
FIG. 2 illustrates a block diagram of an optical disk drive in accordance with the present invention.

FIG. 2 illustrates a block diagram of an optical disk drive in accordance with the present invention. The optical disk drive 10 comprises a flexible power interface control system 20, a laser diode drive (LDD) 30, a laser diode 40, a front-monitored diode (FMD) 50, a photo-detector integrated chip (PDIC) 60, and a spindle motor 70. The LDD 30 is used to drive the laser diode 40 for generating a laser power corresponding to a driving voltage or driving current outputted from the LDD 30. The FMD 50 is used to monitor present laser power then report to an APC loop. The PDIC 60 is used to detect the laser light signal into an electrical signal and feedback the electrical signal to a servo control module. The spindle motor 70 spins the disk 80 according to the command from the servo control module when reading or writing the disk 80.

The flexible power interface control system 20 comprises a write strategy control module 22, an automatic power control (APC) loop 24, a servo control module 26 and an interface setting module 27. The servo control module 26 is used to identify a controlling state of the optical disk drive 10 for reading or writing the disk 80. The controlling state includes the disk type of an inserted disk, the rotation speed or data transferring rate. The servo control module 26 comprises an identifying interface 28 for identifying the disk type then issues an identified result. The write strategy control module 22 generates the optimum write strategy for writing the inserted disk according to the controlling state. The interface setting module 27 is used for setting the power interfaces according to the write strategy or the controlling state. The APC loop 24 is used to generate a plurality of driving signals each corresponding to the power interfaces and selectively sum up to an LD driving signal according to the setting of the power interfaces. Although the write strategy control module 22, the APC loop 24, the servo control module 26 and the identifying interface 28 are designed as being contained within the flexible power interface control system 20 in this embodiment of the present invention, they can also be implemented in any other proper forms for facilitating the same functions respectively according to the requirement in practice.

Figure 3:
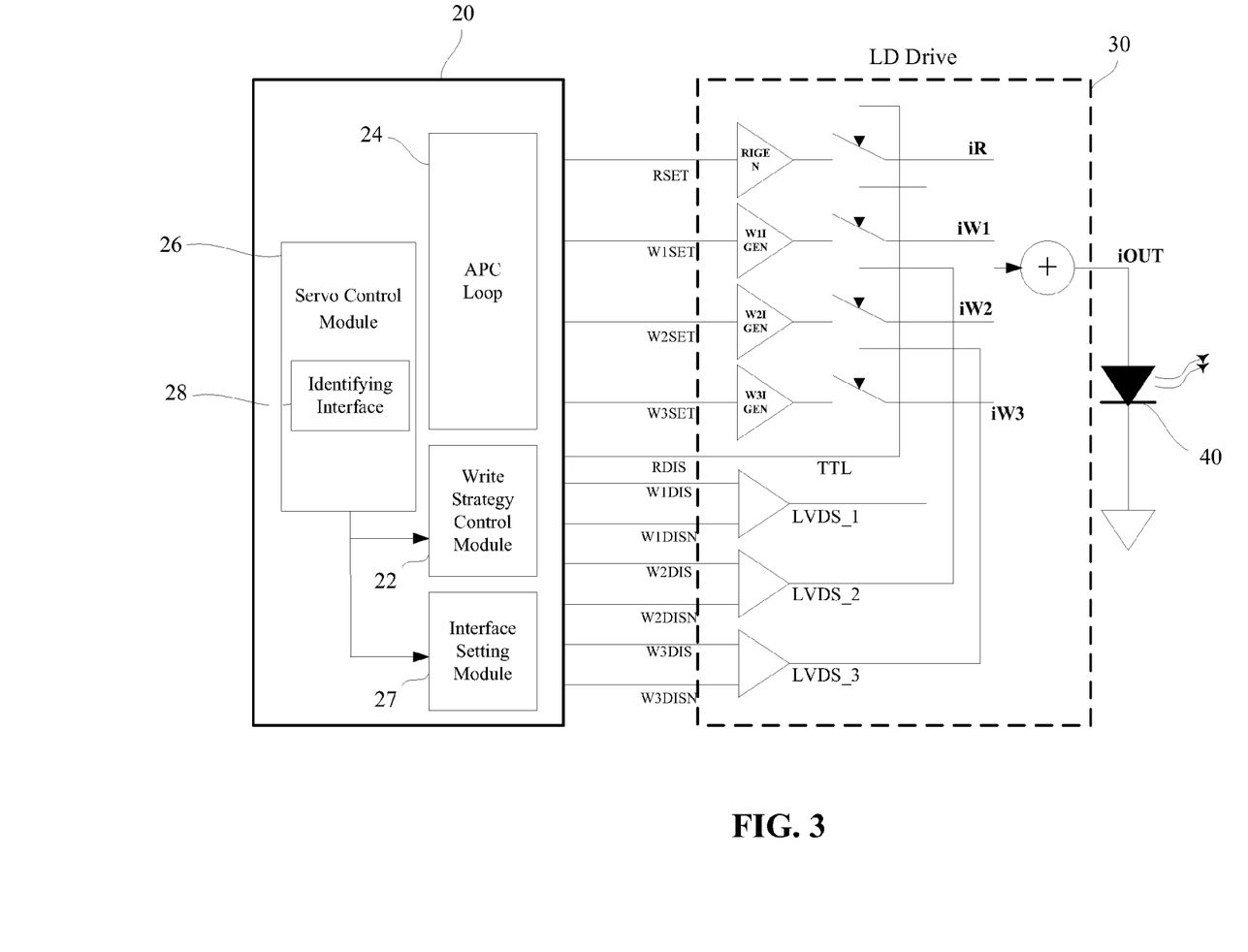
FIG. 3 illustrates a simplified block diagram of a flexible power interface control system and an LDD.

FIG. 3 illustrates a simplified block diagram of the power interfaces in the LDD 30 and the flexible power interface control system 20. The power interfaces comprises four interfaces, such as TTL, LVDS_1, LVDS_2 and LVDS_3, controlled by the flexible power interface control system 20. The interface setting module 27 sets the power interfaces of the TTL, LVDS_1, LVDS_2, and LVDS_3 according to the write strategy or the controlling state. The interface setting module 27 selects to enable one or more of the TTL, LVDS_1, LVDS_2 and LVDS_3 power interfaces of the LDD according to the present controlling state or write strategy, so as to properly drive the laser diode in order to obtain an optimized recording performance when writing the inserted disk. The TTL power interface is implemented by a transistor-transistor logic (TTL) interface, and the LVDS_1, LVDS_2 and LVDS_3 power interfaces are implemented by low voltage differential signaling (LVDS) interfaces. The TTL power interface is controlled by an RDIS signal, the LVDS_1 power interface is controlled by a differential signal pair W1DIS and W1DISN, the LVDS_2 power interface is controlled by a differential signal pair W2DIS and W2DISN, and the LVDS_3 power interface is controlled by a differential signal pair W3DIS and W3DISN. The TTL, LVDS_1, LVDS_2 and LVDS_3 power interface respectively setting by the interface setting module 27 for determining a total driving current iOUT to drive the laser diode 40. The APC loop 24 comprises four APC power interfaces for controlling each driving signal of the power interface to drive the laser diode 40. The four APC driving signals are the RSET, W1SET, W2SET, and W3SET signals for controlling the LDD 30 to generate the driving current iR, iW1, iW2 and iW3 to drive the LD 40. The RSET signal is used to control the reading power, and the W1SET, W2SET and W3SET signals are used to control the writing power.

Figure 4:
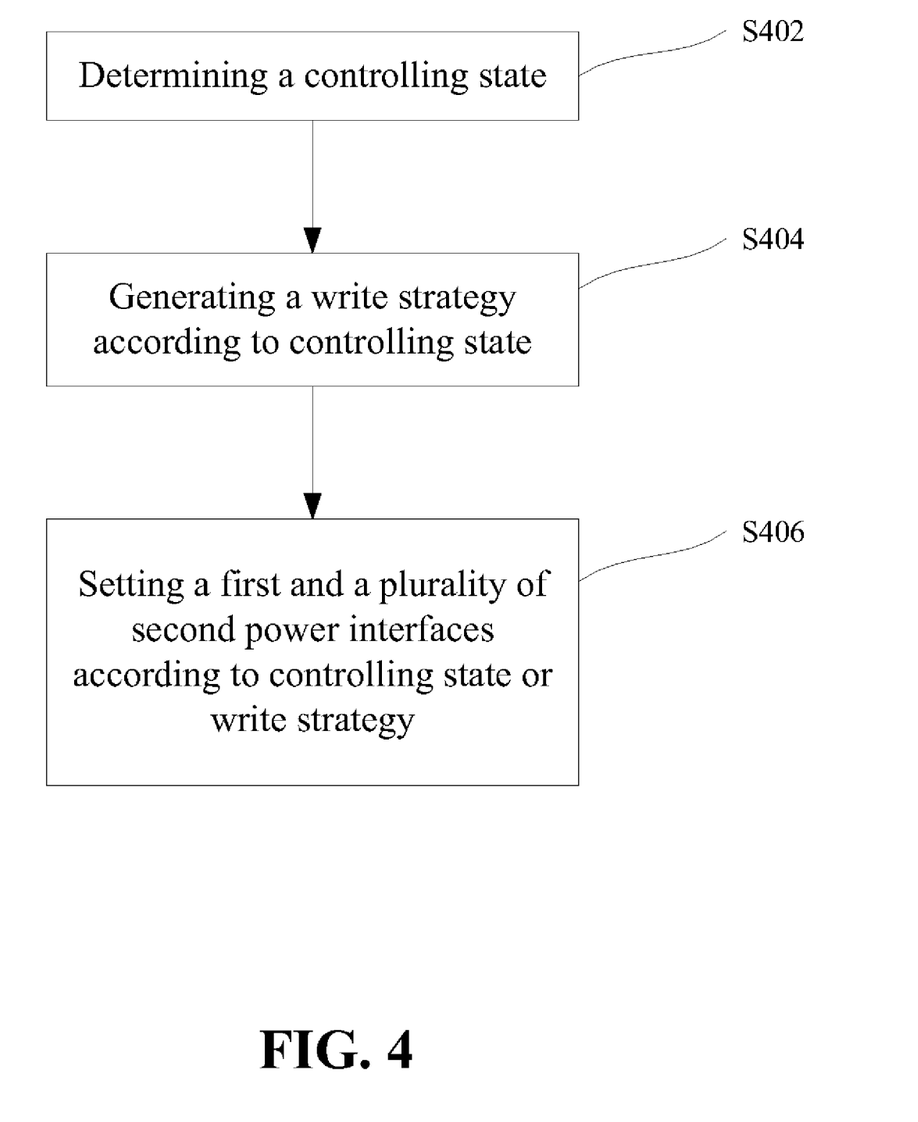
FIG. 4 shows a flow chart of the method for flexibly changing the LDD setting complied with different controlling states in accordance with the present invention.

Referring to FIG. 4, a flow chart of a method for flexibly changing the LDD setting complied with different controlling states or different write strategies is shown. The method comprises the following steps of:

Step S402 The servo control module 26 determines a controlling state of the optical disk drive 10 for reading or writing the inserted disk. The controlling state includes the disk type of an inserted disk, the rotation speed or data transferring rate.

Step S404 The write strategy control module 22 generates an optimum write strategy for writing the inserted disk according to the controlling state. The write strategy can be a single pulse write strategy or a multi-pulse write strategy for writing the inserted disk.

Step S406 The interface setting module 27 sets a plurality of power interfaces according to the write strategy or the controlling state. The power interfaces comprises a TTL power interface and a plurality of LVDS power interface, controlled by the interface setting module 27. The controlling state or the write strategy represents a writing mode or a reading mode of the optical disk drive 10. For a first situation, the TTL power interface is set to control a read power driving signal to the LD 40 when the optical disk drive 10 is in the read mode, and the LVDS power interfaces are set to control the read power driving signal to the LD 40 when the optical disk drive is in the write mode. For a second situation, one of the LVDS power interfaces is set to control a read power driving signal to the LD 40 when the write strategy is the single pulse write strategy, and the TTL power interface is set to control a read power driving signal to the LD 40 when the write strategy is the multi-pulse write strategy.

The method of the present invention is capable of changing the LDD setting according to different controlling states and different write strategies in order to obtain an optimized recording or reading performance. Following descriptions and illustrations will clarify the advantages of the present invention.

Figure 5:
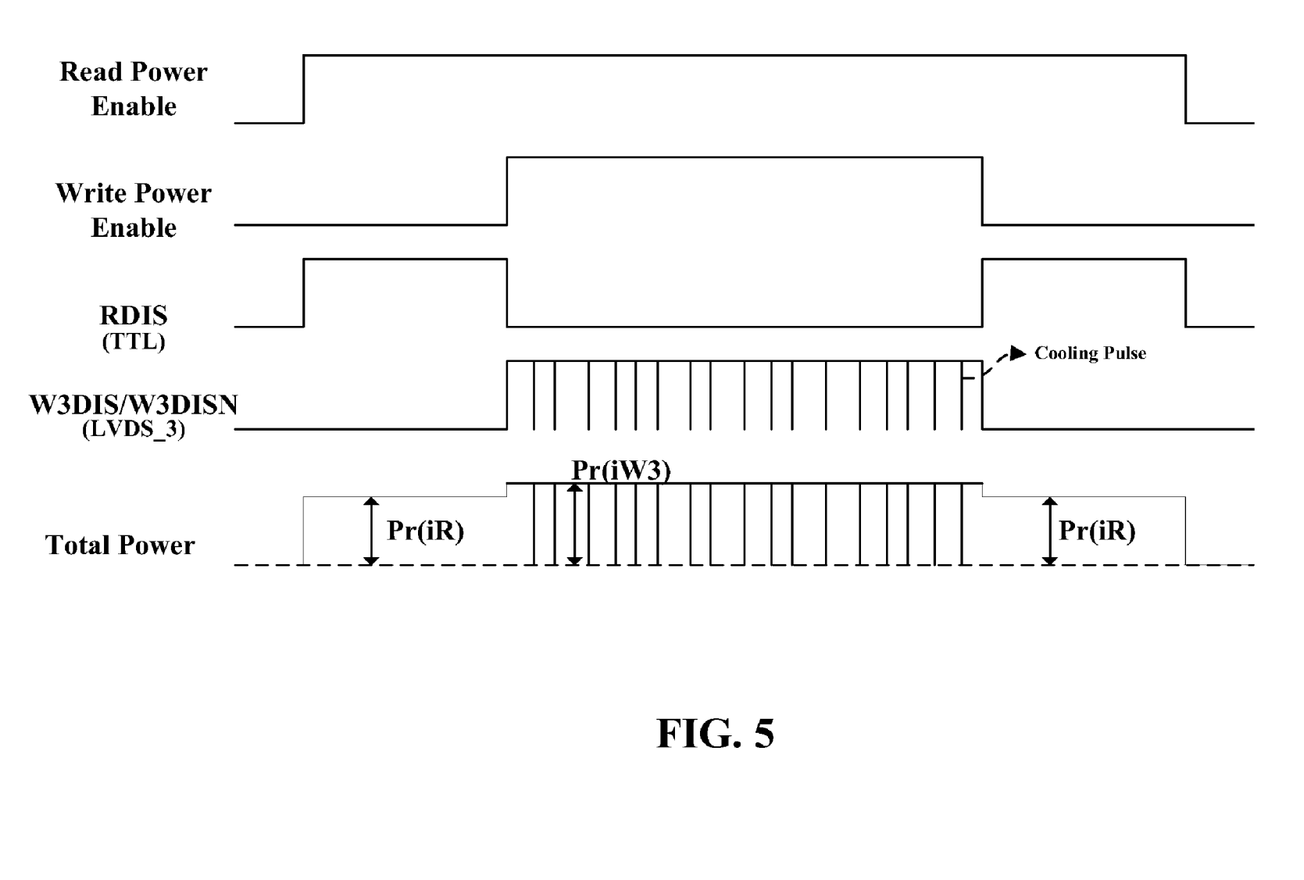
FIG. 5 shows a power control with a flexible LDD setting.

Referring to FIG. 5, a write strategy with a flexible LDD setting is shown. The RDIS signal transmitted through the TTL interface is disabled when the writing power is enabled. The differential signal pair W3DIS/W3DISN transmitted through the LVDS interface is enabled when the writing power is enabled for controlling the writing power. As the faster responding speed relative to the TTL interface, the LVDS interface is capable to precisely controlling the cooling pulses follow the pits for preventing the jitters during writing the disk. The LDD 30 uses the driving current iR through the TTL interface to drive the laser diode 40, but uses the driving current iW3 through the LVDS interface to drive the laser diode 40. Therefore, the TTL interface and the LVDS interface can be flexibly used by the LDD 30 for improving the recording performance.

Figure 6:
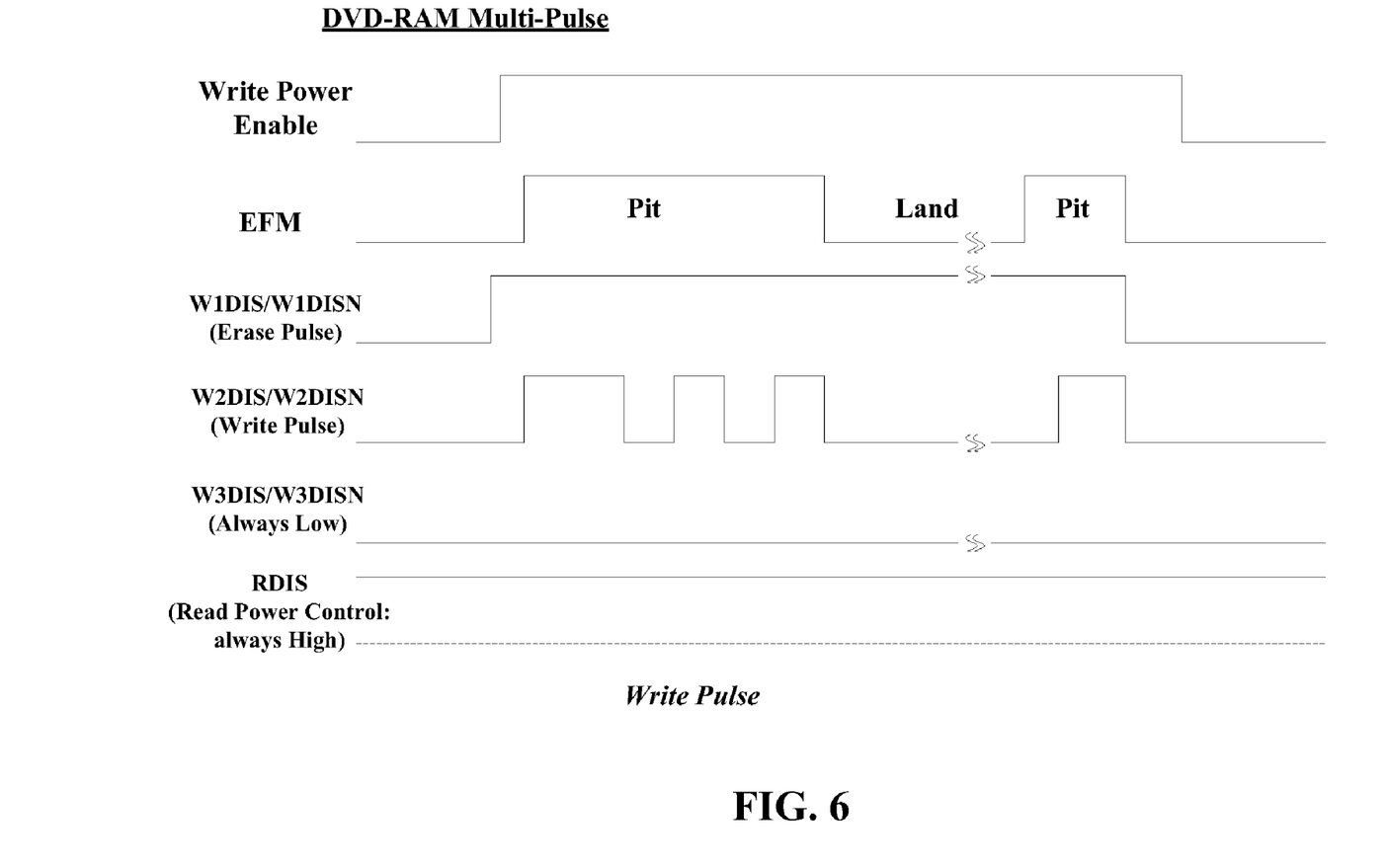
FIG. 6 shows a multi-pulse power control with a flexible LDD setting for DVD-RAM disk.

Referring to FIG. 6, a multi-pulse power control with a flexible LDD setting for DVD-RAM disk is shown. The LDD setting of LDD 30 is changed to comply with the DVD-RAM format when the servo control module 26 determines that the DVD-RAM disk is going to be written under a multi-pulse mode. The LVDS_1 power interface is enabled for receiving the differential signal pair W1DIS/W1DISN to implement an erase pulse. The LVDS_2 power interface is enabled for receiving the differential signal pair W2DIS/W2DISN to implement a write pulse. The LVDS_3 power interface is disabled. The TTL power interface is enabled for maintaining the RDIS signal always at a high level. A total writing pulse for writing the DVD-RAM disk under the multi-pulse mode is generated by synthesizing each pulse from the TTL, LVDS_1, and LVDS_2 power interfaces. Therefore, the LDD setting of LDD 30 can be adjusted to fit for writing the DVD-RAM disk under the multi-pulse mode.

Figure 7:
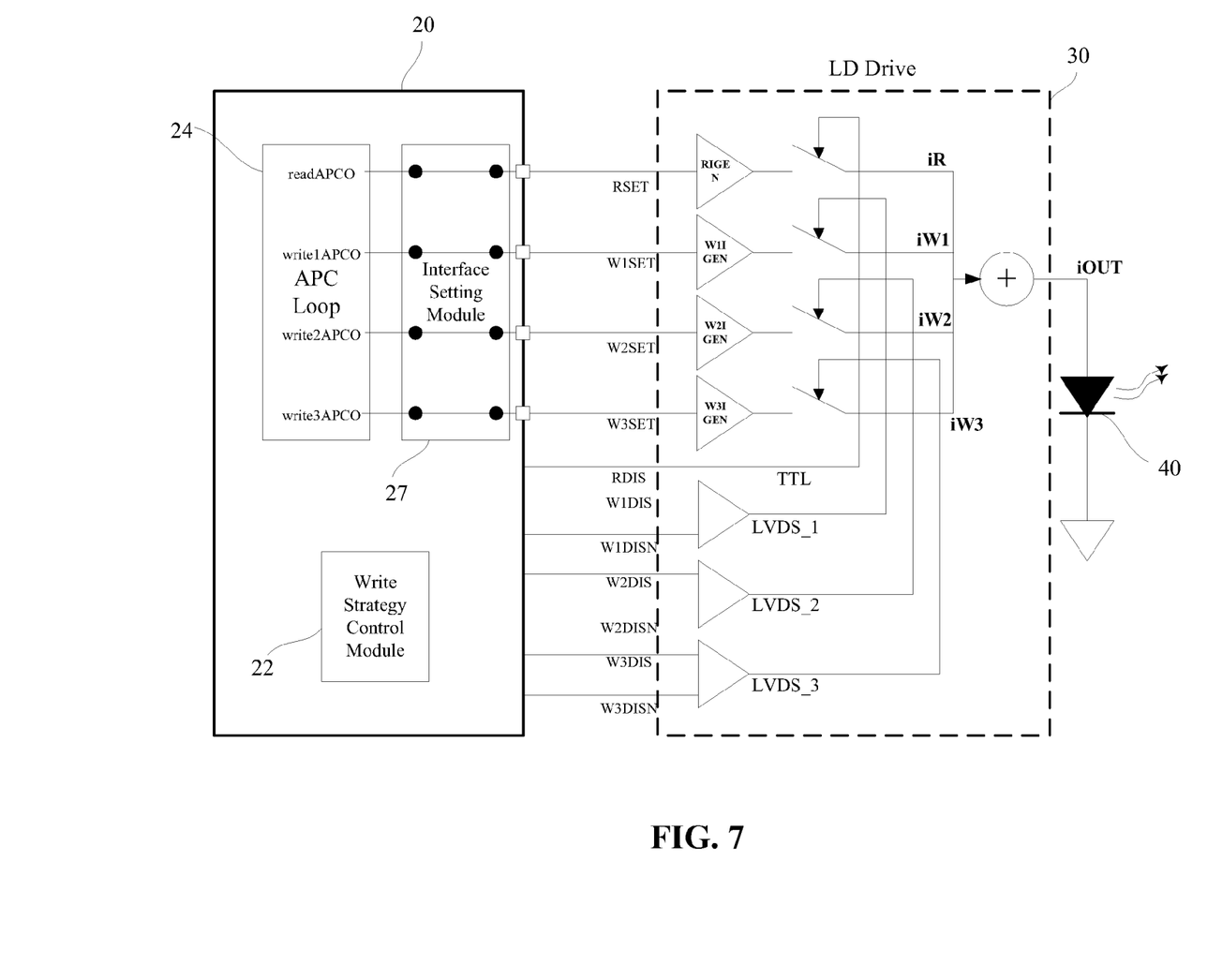
FIG. 7 shows an exemplary diagram of single-pulse power control with a flexible LDD setting for DVD-RAM disk.
Figure 8:
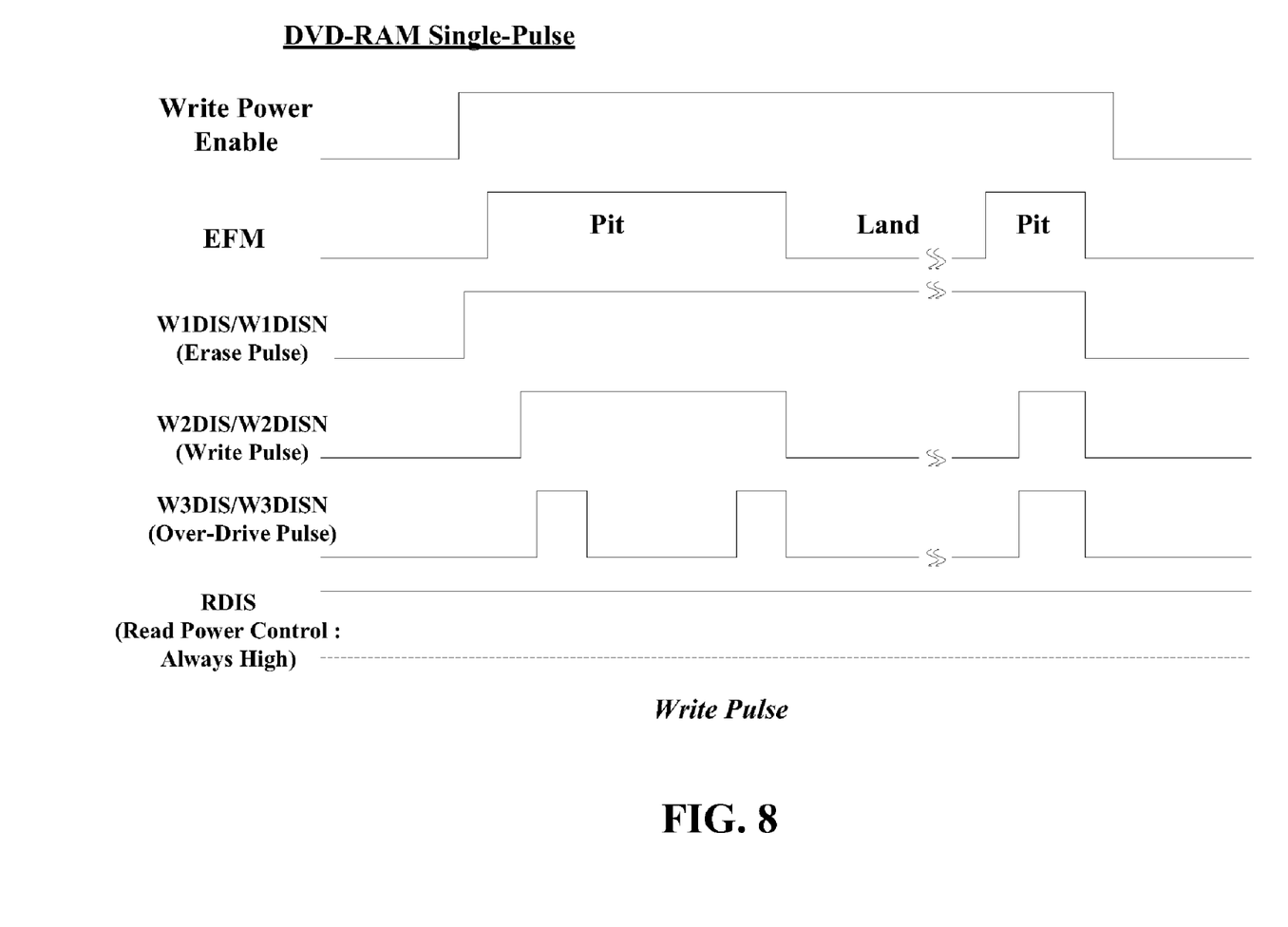
FIG. 8 shows a single-pulse power control with a flexible LDD setting for DVD-RAM disk.

Referring to FIGS. 7 and 8, a single-pulse power control with a flexible LDD setting for DVD-RAM disk is shown. The LDD setting of LDD 30 is changed to comply with the DVD-RAM format when the servo control module 26 determines that the DVD-RAM disk is going to be written under a single-pulse mode. As shown as FIG. 7, the interface setting module 27 sets the TTL power interface to control the reading driving signal readAPCO, and sets the LVDS_1, LVDS_2 and LVDS_3 power interfaces to respectively control the writing driving signals write1APCO, write2APCO and write3APCO. The LVDS_1 power interface is enabled for receiving the differential signal pair W1DIS/W1DISN to implement an erase pulse. The LVDS_2 power interface is enabled for receiving the differential signal pair W2DIS/W2DISN to implement a write pulse. The LVDS_3 power interface is enabled for receiving the differential signal pair W3DIS/W3DISN to implement an over-drive pulse. The TTL power interface is enabled for maintaining the RDIS signal always at a high level. A resulant writing pulse for writing the DVD-RAM disk under the single-pulse mode is generated by synthesizing each pulse from the TTL, LVDS_1, LVDS_2 and LVDS_3 power interfaces. Therefore, the LDD setting of LDD 30 can be adjusted to fit for writing the DVD-RAM disk under the single-pulse mode.

Figure 9:
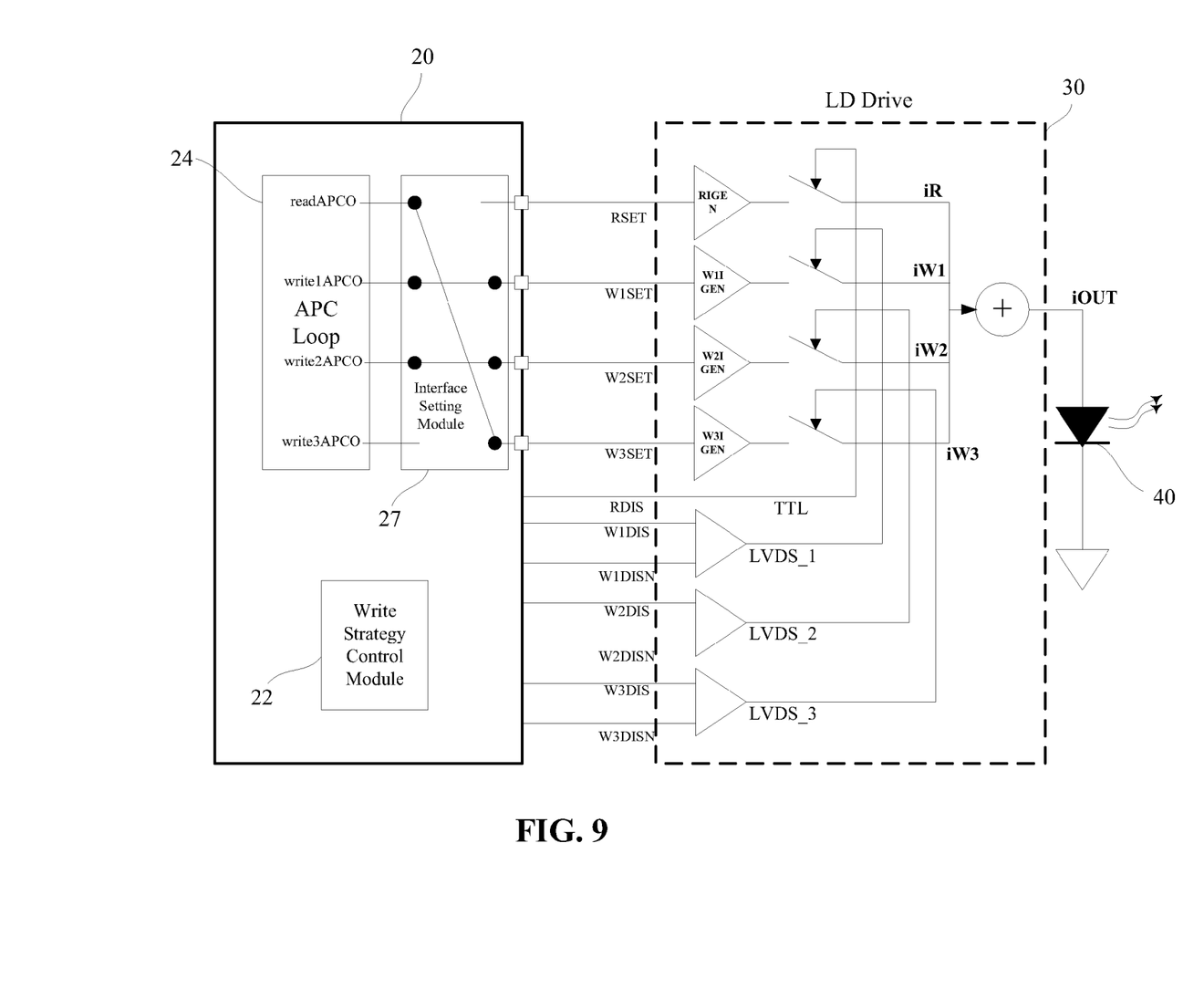
FIG. 9 shows an exemplary diagram of single-pulse power control with a flexible LDD setting for DVD+R disk or DVD−R disk.
Figure 10:
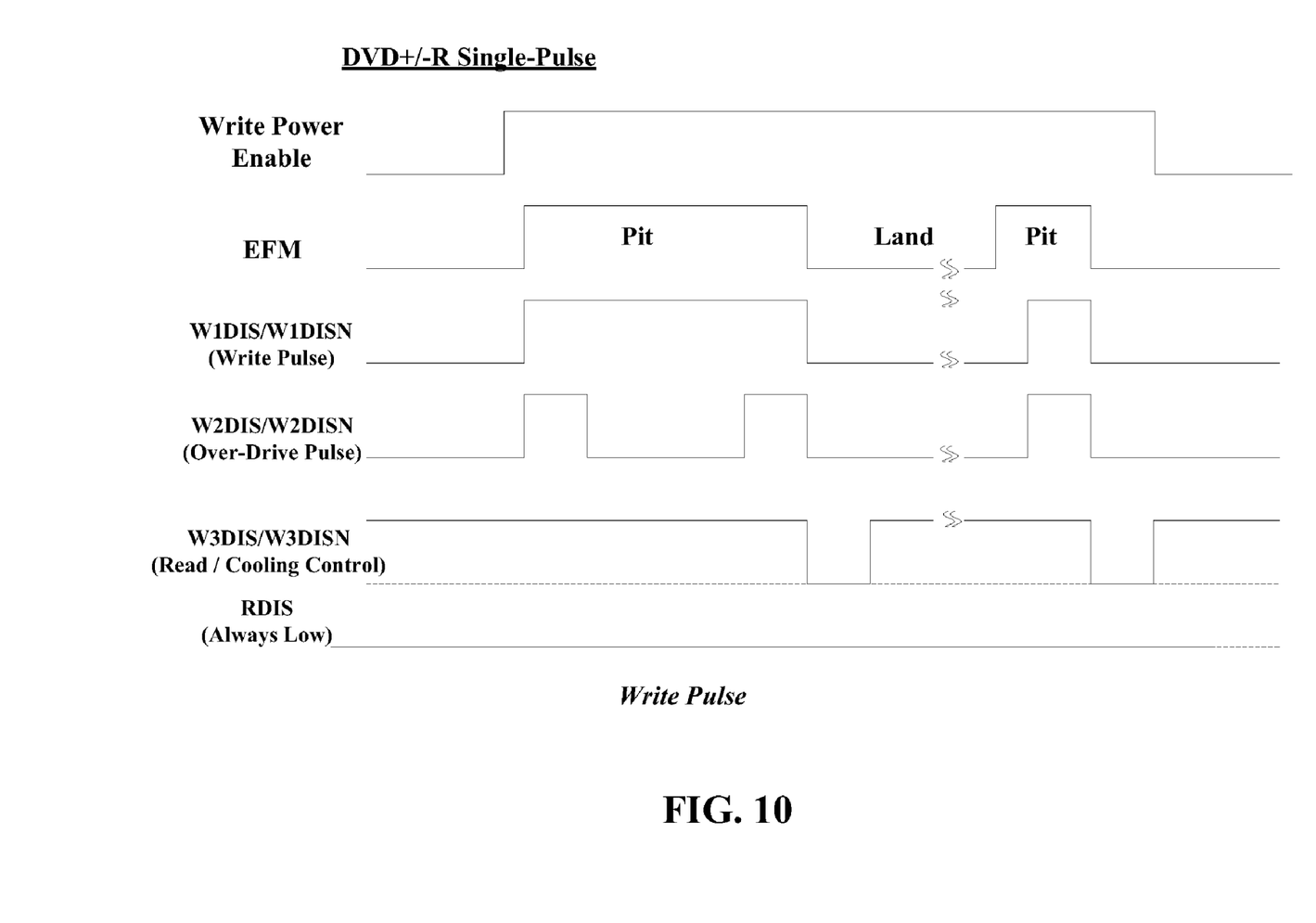
FIG. 10 shows a single-pulse power control with a flexible LDD setting for DVD+R disk or DVD-R disk.

Referring to FIGS. 9 and 10, a single-pulse power control with a flexible LDD setting for DVD+R disk or DVD−R disk is shown. The LDD setting of LDD 30 is changed to comply with the DVD+/−R format when the servo control module 26 determines that the DVD+/−R disk is going to be written under a single-pulse mode. As shown as FIG. 9, the interface setting module 27 sets the LVDS_3 power interface to control the reading driving signal readAPCO, and sets the LVDS_1 and LVDS_2 power interfaces to respectively control the writing driving signals write1APCO and write2APCO. The LVDS_1 power interface is enabled for receiving the differential signal pair W1DIS/W1DISN to implement a write pulse. The LVDS_2 power interface is enabled for receiving the differential signal pair W2DIS/W2DISN to implement an over-drive pulse. The LVDS_3 power interface is enabled for receiving the differential signal pair W3DIS/W3DISN to implement a read pulse or a cooling control pulse. The TTL power interface is disabled when writing the DVD+/−R disk. A resultant writing pulse for writing the DVD+/−R disk under the single-pulse mode is generated by synthesizing each pulse only from the LVDS power interfaces. Therefore, the LDD setting of LDD 30 can be adjusted to fit for writing the DVD+/−R disk under the single-pulse mode.

Consequently, the flexible power interface control system and method according to the present invention can flexibly change the LDD setting for complying with different controlling states or different write strategies. The different controlling states or different write strategies may be used for different disk types or different writing modes. The flexible LDD setting in accordance with the present invention is contributing to improve the recording performance and stability of an optical disk drive for complying with various disk types or different writing modes.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. An flexible power interface control system of an optical disk drive having a laser diode (LD) for generating a laser power and a laser diode drive (LDD) for driving the laser diode, said LDD comprising at least a first power interface and a plurality of second power interfaces, the first power interface having lower response rate than the second power interface, comprising:
   a servo control module for identifying a controlling state of the optical disk drive;
   a write strategy control module for generating a write strategy according to the controlling state; and
   an interface setting module for setting the first and second power interfaces according to the write strategy or the controlling state.

2. The flexible power interface control system of claim 1, wherein the controlling state is a disk type of an inserted disk.

3. The flexible power interface control system of claim 1, further comprising:
   an automatic power control (APC) loop, generating a plurality of driving signals each corresponding to the first and second power interfaces and selectively sum up to an LD driving signal according to the setting of the first and second power interfaces.

4. The flexible power interface control system of claim 1, wherein the first power interface of the LDD is a transistor-transistor logic (TTL) interface, and the second power interface of the LDD is a low voltage differential signaling (LVDS) interface.

5. The flexible power interface control system of claim 1, wherein the controlling state is the rotation speed or data transferring rate.

6. The flexible power interface control system of claim 1, wherein the controlling state or the write strategy represents the writing mode or the reading mode of the optical disk drive.

7. The flexible power interface control system of claim 6, wherein when the optical disk drive is in the read mode, the interface setting module sets the first power interface to control a read power driving signal to the LD, and when the optical disk drive is in the write mode, the interface setting module sets one of the second power interfaces to control the read power driving signal to the LD.

8. The flexible power interface control system of claim 1, wherein the write strategy is a single pulse or a multi-pulse write strategy.

9. The flexible power interface control system of claim 8, wherein when the write strategy is the single pulse write strategy, the interface setting module sets one of the second power interfaces to control a read power driving signal to the LD, and when the write strategy is the multi-pulse write strategy, the interface setting module sets the first power interface to control the read power driving signal to the LD.

10. An flexible power interface control method of an optical disk drive having a laser diode (LD) for generating a laser power and a laser diode drive (LDD) for driving the laser diode, said LDD comprising at least a first power interface and a plurality of second power interfaces, the first power interface having lower response rate than the second power interface, comprising:

determining a controlling state of the optical disk drive;

generating a write strategy according to the controlling state; and setting the first and second power interfaces according to the write strategy or the controlling state.

11. The flexible power interface control method of claim 10, wherein the controlling state is a disk type of an inserted disk.

12. The flexible power interface control method of claim 10, wherein the first power interface of the LDD is a transistor-transistor logic (TTL) interface, and the second power interface of the LDD is a low voltage differential signaling (LVDS) interface.

13. The flexible power interface control method of claim 10, wherein the controlling state is the rotation speed or data transferring rate.

14. The flexible power interface control method of claim 10, wherein the controlling state or the write strategy represents the writing mode or the reading mode of the optical disk drive.

15. The flexible power interface control method of claim 14, wherein when the optical disk drive is in the read mode, the first power interface is set to control a read power driving signal to the LD, and when the optical disk drive is in the write mode, the second power interfaces are set to control the read power driving signal to the LD.

16. The flexible power interface control method of claim 10, wherein the write strategy is a single pulse or a multi-pulse write strategy.

17. The flexible power interface control method of claim 16, wherein when the write strategy is the single pulse write strategy, one of the second power interfaces is set to control a read power driving signal to the LD, and when the write strategy is the multi-pulse write strategy, the first power interface is set to control a read power driving signal to the LD.

* * * * *